(No Model.)
C. E. GRIFFITH.
FASTENER FOR FENCE WIRES AND BOARDS.
No. 293,009. Patented Feb. 5, 1884.
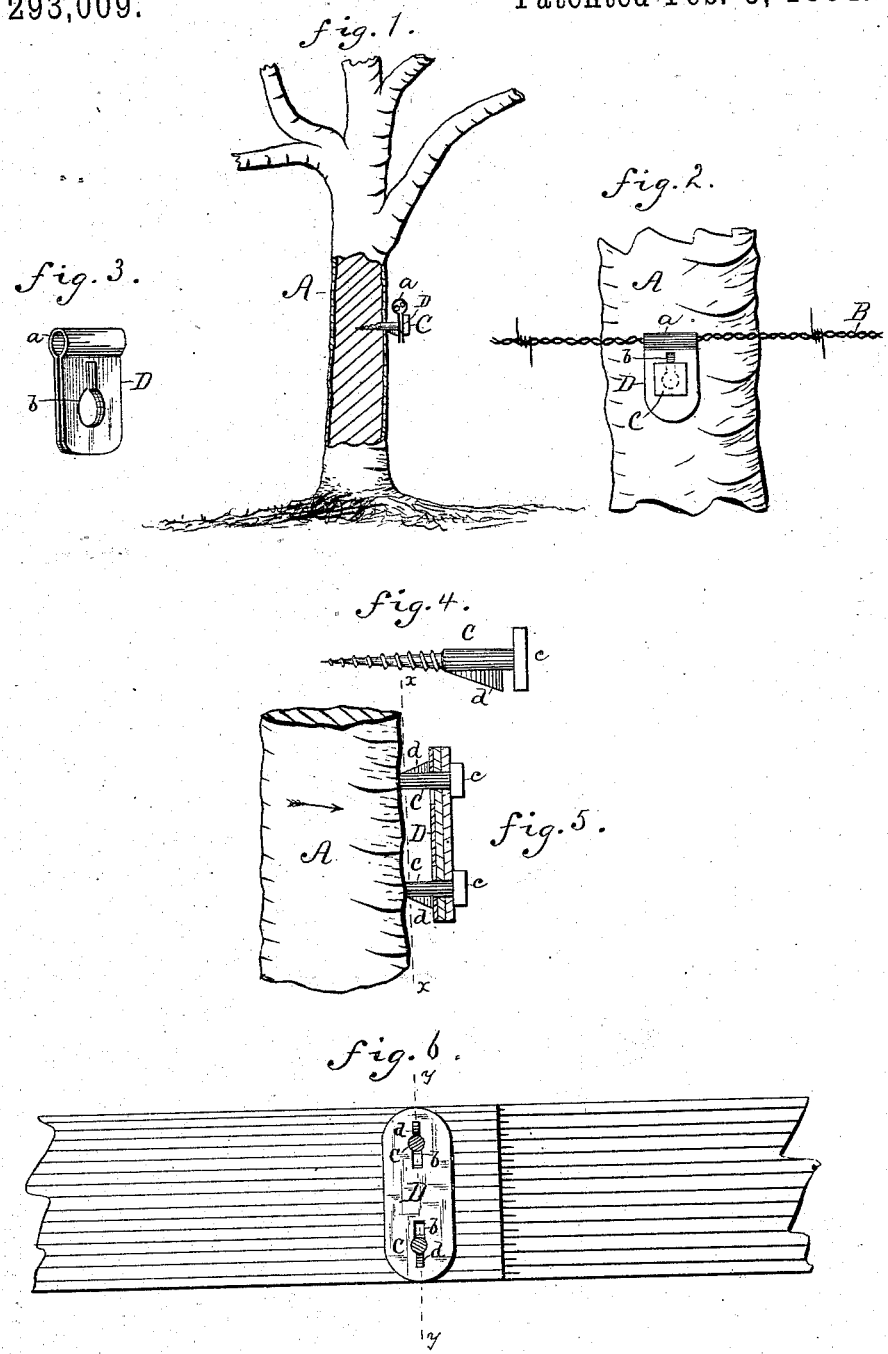

UNITED STATES PATENT OFFICE.

CHARLES E. GRIFFITH, OF STORM LAKE, IOWA.

FASTENER FOR FENCE WIRES AND BOARDS.

SPECIFICATION forming part of Letters Patent No. 293,009, dated February 5, 1884.

Application filed August 17, 1883. (No model.)

*To all whom it may concern:*

Be it known that I, CHARLES E. GRIFFITH, of Storm Lake, in the county of Buena Vista and State of Iowa, have invented a new and useful Improvement in Wire and Board Fasteners; and I do hereby declare that the following is a full, clear, and exact description of the same, reference being had to the accompanying drawings, forming part of this specification, in which—

Figure 1 is a sectional view of a tree, taken transversely to the wire, and showing the connection of the same. Fig. 2 is a side view on a little larger scale. Fig. 3 is a perspective view of the plate D. Fig. 4 is a side view of the fastening-screw. Figs. 5 and 6 show a modification, in which the same devices are used for putting up board fences, Fig. 5 being a cross-section through line $y\,y$ of Fig. 6, and Fig. 6 being a section through line $x\,x$ of Fig. 5, looking in the direction of the arrows.

In the western country, where wire fences are largely made use of and timber is scarce, it frequently happens that the wires are fastened as a matter of convenience and economy, to growing trees in the place of posts. The new wood of these trees gradually grows over and around the wires, thus preventing any readjustment of the wire, while the swaying of the trees in windy weather snaps the wires and destroys the fence. The trees are also weakened by the wires passing through them, and will break off at that place in windy weather.

The object of my invention is to provide a form of fastening for connecting the wires to the trees which will permit the wire to be readjusted from time to time and set farther away from the tree for the purpose of protecting the trees, and which will cause the wire to be held loosely, so as not to be affected by the swaying of the trees from the wind, and which construction of fastening will also be applicable to fastening boards to trees in making a board fence, as will be fully described hereinafter.

In the drawings, A represents a section of a tree-body, to which a barbed-wire cable, B, is attached by my fastening. This fastening consists of a plate, D, of metal, bent in the middle to form a tube, $a$, through which the wire cable loosely passes. The two ends of this plate rest flat against each other, and have each a key-hole slot, $b$, which slots are brought into registration, and through which there passes a screw-bolt, C, of a peculiar construction—that is to say, the bolt C has a flat head, $c$, and at a short distance from its head a projecting bit or shoulder, $d$. The shank of the screw corresponds to the round end of the key-hole slot and rests within it, while the bit or shoulder $d$ corresponds to and passes through the narrow part of the key-hole. Now, in fastening the wire cable to the tree, the plate D is bent around the wire, and the latter allowed to rest loosely in the tubular part $a$. The two key-hole openings being brought into registration, the screw-bolt C is passed through them until the bit or shoulder $d$ is entirely through, and the screw is then turned into the tree by a wrench, screw-driver, or other device, the plate D and wire being held a short distance from the tree between the end of the bit $d$ and the head of the screw, which screw is left in a position in which the bit is out of registration with the slot of the key-hole, so that the two ends of the plate D cannot separate. It will be seen that as the tree grows larger and the wood fills out toward the wire the screw-bolt may be turned back, so as to set the plate and the wire farther away from the tree, and as the wire is loosely held in the tube $a$ of the plate the swaying of the trees from the wind causes no detrimental strain upon the wire, and does not break it, and the tree is also protected.

As a modification of my invention, instead of folding the plate D on itself to form a tube, $a$, I may dispose it flat against the end of a board, where it laps past another, and use it as a washer-plate in connection with two screw-bolts, C C, to fasten the ends of two boards together and attach them to a tree or post, as shown in Figs. 5 and 6.

Having thus described my invention, what I claim as new is—

1. The combination of the slotted plate D, and the screw-bolt C with head $c$ and bit $d$, for holding the members of the fence at a distance from the posts or trees, substantially as shown and described.

2. The combination, with a wire cable, of the slotted plate D, bent to form tube $a$, and the screw-bolt C, having head $c$ and bit or shoulder $d$, for holding the wire at a distance from the post or tree, as described.

CHARLES E. GRIFFITH.

Witnesses:
 J. A. DEAN,
 A. E. WEBB.